US010796081B2

(12) United States Patent
Kharbanda et al.

(10) Patent No.: US 10,796,081 B2
(45) Date of Patent: Oct. 6, 2020

(54) SYSTEM AND METHOD FOR PROCESSING ELECTRONIC FORMS

(71) Applicant: Tata Consultancy Services Limited, Mumbai (IN)

(72) Inventors: Tripat Singh Kharbanda, Haryana (IN); Sarabdeep Singh, Haryana (IN); Gaurav Kandpal, Haryana (IN); Kunal Kumar, Haryana (IN); Ashish Kumar Gupta, Haryana (IN); Anupam Grover, Haryana (IN); Vidhi Lohani, Haryana (IN)

(73) Assignee: Tata Consultancy Services Limited, Mumbai (IN)

( * ) Notice: Subject to any disclaimer, the term of this patent is extended or adjusted under 35 U.S.C. 154(b) by 163 days.

(21) Appl. No.: 14/529,914

(22) Filed: Oct. 31, 2014

(65) Prior Publication Data

US 2016/0124929 A1 May 5, 2016

(51) Int. Cl.
*G06F 40/174* (2020.01)
*G06F 40/186* (2020.01)

(52) U.S. Cl.
CPC .......... *G06F 40/174* (2020.01); *G06F 40/186* (2020.01)

(58) Field of Classification Search
CPC .................................................. G06F 17/243
See application file for complete search history.

(56) References Cited

U.S. PATENT DOCUMENTS

| 6,701,308 B1 * | 3/2004 | Chen ..................... G06F 17/243 |
| | | 707/758 |
| 7,941,744 B2 * | 5/2011 | Oppenlander et al. ..................... |
| | | G06F 17/00 |
| 8,060,438 B2 * | 11/2011 | Dhar ........................ A61J 9/00 |
| | | 705/38 |

(Continued)

OTHER PUBLICATIONS

Wufoo: The Features—Here's what Wufoo can do for you, SurveyMonkey Inc., Online Form Creation and Reporting Features, retrieved Oct. 30, 2014 [www.wufoo.com/features/], (Oct. 30, 2014), 10 pgs.

(Continued)

*Primary Examiner* — James J Debrow
(74) *Attorney, Agent, or Firm* — Schwegman Lundberg & Woessner, P.A.

(57) ABSTRACT

Electronic form (e-form) processing includes generating an e-form based on a form template, the form template being selected from pre-defined form templates. The e-form includes modular sections arranged in a pre-defined order, each modular section being associated with user privileges. Further, data is retrieved from at least one database to partly populate at least one of the modular sections in the e-form. Subsets of the modular sections are provided to designated users based on the user privileges and a workflow associated with the e-form. A processed e-form, including the retrieved data and the data inputs, and having at least one external document, is created based on data inputs received from the designated users. A processed electronic document including the modular sections populated with the retrieved data, the (Continued)

data inputs, and external data from the external document arranged in the pre-defined order is generated from the processed e-form.

17 Claims, 4 Drawing Sheets

(56) References Cited

U.S. PATENT DOCUMENTS

| | | | |
|---|---|---|---|
| 2004/0205531 A1* | 10/2004 | Innes | G06F 17/243 715/224 |
| 2008/0091780 A1* | 4/2008 | Balan | H04L 63/0428 709/204 |
| 2008/0127032 A1* | 5/2008 | Mital et al. | G06F 9/44 |
| 2009/0006936 A1* | 1/2009 | Parker et al. | G06F 17/00 |
| 2010/0174974 A1* | 7/2010 | Brisebois et al. | G06F 17/00 |
| 2010/0268705 A1* | 10/2010 | Douglas | G06Q 10/06 707/723 |
| 2012/0166928 A1* | 6/2012 | Stern | G06F 17/243 715/223 |
| 2014/0115443 A1* | 4/2014 | Shwartz | G06F 17/24 715/234 |
| 2016/0124926 A1* | 5/2016 | Fallah | G06F 3/0486 715/271 |
| 2018/0144421 A1* | 5/2018 | Williams et al. | G06Q 50/18 |

OTHER PUBLICATIONS

"Adobe Livecycle ES4 Overview", Product Information Brochure, Adobe, Sep. 16, 2013, (Sep. 16, 2013), 68 pgs.

"Google—Apps for Work; Google Forms—Easy to create surveys and forms for everyone", Google, Inc., Form builder of Google docs, Along with Google App, retrieved Oct. 30, 2014, (Oct. 30, 2014), 4 pgs.

* cited by examiner

SYSTEM AND METHOD FOR PROCESSING ELECTRONIC FORMS

TECHNICAL FIELD

The present subject matter relates, in general, to systems and methods for processing electronic forms, and in particular to a system and method for automated generation and processing of electronic forms.

BACKGROUND

Processing of forms is a common activity carried out by most organizations as a part of their day to day activities or business processes. Usually, organizations use different forms for processing different types of requests and each of these forms may be processed using different workflows. For example, financial institutions may require customers to fill-in forms for applying for credit or loans. The type of form and workflow used in this case may vary by the type of customer, such as an individual, a small scale enterprise, or a large organization, the type of loan applied for, such as a loan for purchase of property, a loan for purchase of capital goods, or a personal loan, and the amount of credit requested. In another example, a university may use different student application forms and may process the forms differently based on the course of study and eligibility of the students. In yet another example, an insurance corporation may use different forms for different insurance products. Further, a government organization may use different forms and workflows in different departments. Organizations may also use various forms for their internal processes, such as recruitment, approving finances, and the like. With increased use of computing systems for carrying out business activities, many of such form processing activities are also being increasingly automated.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DESCRIPTION OF EMBODIMENTS

Typically, for automation of form processing in an organization, various templates of forms have to be designed and associated with respective workflows. For this, generally, a template has to be created separately for each type of form and has to be associated with respective workflow even though some or all of the forms may have certain common sections and common workflow steps. Thus, the creation of templates and workflows generally requires high level of programming skills and can be inefficient since it involves duplication of efforts. Further, while generally workflows are used to assign a task or an activity related to form processing to a user, the user may have to separately access the form and relevant data or documents from multiple different sources or databases to be able to perform the task. As a result, the processing of the forms may still require a lot of manual effort and may be inefficient. Moreover, the processed information may also be recorded in different databases and hence, may be difficult to retrieve and correlate with the source data later when required. Further, in case any new forms or workflows are to be implemented, the organization has to contact the software developer or programmer for this purpose. As a result, the creation of new forms and workflows becomes a time consuming and tedious process.

Systems and methods of the present subject matter allow for processing of e-forms in an efficient, flexible, and extensible manner. As used herein, processing of e-forms may include generation and processing of e-forms. Further, "customer" can refer to a person, such as an individual or a firm, who makes a request or submits an application with information for generation of the e-form, while "user" can refer to a person who generates and/or processes the e-form. It will be appreciated that different users may access and work with the e-processing systems and methods at different stages and sometimes a user can also refer to a group of users. For example, at different points in time, the user can be a system administrator, a business analyst, an operations executive, etc.

The e-form processing systems and methods can be implemented, for example, by a financial institution for processing credit forms in accordance to a credit procedure and credit policy of the financial institution. In other examples, the e-form processing systems and methods may be implemented by other organizations, such as universities, insurance firms, brokerages, government organizations, and the like, that generate and process multiple forms and may use different workflows for processing of different forms.

In one example, each e-form can be generated as a modular e-form based on a corresponding form template. The form template can have a plurality of modular sections and each modular section may have one or more data fields for data entry. In one implementation, multiple form templates can be pre-defined, such that each form template includes one or more modular sections. The form templates may be defined by a user through a graphical user interface (GUI) that provides interactive elements for selecting modular sections from available modular sections present in a modular section repository. The interactive elements can include, for example, apps or widgets or icons provided over a drag and drop interface. In another example, the interactive elements can be buttons or tags.

The form templates thus defined can also be associated with workflows using a graphical workflow editor that allows business rules to be integrated into the workflow. The workflows can be defined such that different subsets of modular sections of an e-form can be provided to different users for processing based on respective user role and privileges, thus ensuring data security and confidentiality.

In operation, a form processing request including parameters related to a customer requirement may be received. Based on the customer requirement, an appropriate form template can be automatically selected from the pre-defined form templates and an e-form can be generated. The e-form thus generated can include the plurality of modular sections arranged in a pre-defined order, each modular section being associated with user privileges based on user roles. Further, one or more of the modular sections may be associated with one or more databases. Accordingly, data corresponding to the customer making the request may be retrieved automatically from at least one database to partly populate at least one of the modular sections in the e-form upon its generation. Additional data may be then populated in the e-form either by the customer, for example, through a customer user interface, or by a user, for example, based on a paper form filled-in by the customer.

Once the e-form is populated initially with retrieved data, subsets of the modular sections of the e-form may be provided to designated users through respective user interfaces based on their user privileges and a workflow associated with the e-form. For example, based on the workflow, the e-form may be provided to a first designated user for verifying or adding basic customer data, such as name, date of birth, and address, based on documents submitted by the customer. Accordingly, modular sections that include the basic customer data may have user privileges associated with them that allow the first designated user to access the basic customer data, while other modular sections may not be accessible by the first designated user. Further, digital copies of the documents submitted by the customer may also be associated with the modular section and stored in a database.

In one example, after the first designated user verifies the basic customer data, the e-form may be provided to a second designated user and so on as per the workflow. In one implementation, certain designated users may be provided the e-form in parallel for processing, while in another implementation, the designated users may be provided the e-form sequentially.

Further, the user privileges may also allow different users to perform one or more activities, such as read, write, comment, verify, forward to another user for comment or verification, attach an external document, and the like. Based on the workflow and the user privileges, data may be entered, corrected, or commented upon by different users for processing the e-forms. In one example, business rules may be integrated with the workflow to validate the data and enforce business policies as the e-form is being processed.

Accordingly, a processed e-form may be created based on data inputs received from the designated users. The processed e-form can include the retrieved data, the data inputs, and can also have at least one external document associated with it to substantiate or provide additional information as per the e-form processing requirements. The external document can be, for example, a PDF document, an image file, an XML document, an MS-Office document, etc. The data inputs in the processed e-form can also include a decision or recommendation from a final designated user as to whether the application or request of the customer can be accepted or not. Based on the processed e-form, a processed electronic document can be generated that includes the modular sections populated with the retrieved data, the data inputs, and external data from the external document. Further, the retrieved data, the data inputs, and the external data may be arranged in the pre-defined order in the processed electronic document for further decision making or for archival. For example, the processed electronic document may be an XML document, a PDF document, an image document, an MS-Office document and the like.

The e-form processing systems and methods of the present subject matter thus substantially reduce redundancy in activities and also the level of programming skills required for creation of form templates and workflows. As a result, new form templates and workflows can be created easily and efficiently by the users without involvement of software developers or programmers. Further, based on the workflow and rules, the processing of the e-forms can also be streamlined and made efficient as discussed below in more detail. Moreover, the present subject matter provides for generating a processed electronic document using data from different sources, such as data retrieved from databases, data input by users, and data from external documents, arranged in a pre-defined order for faster decision making and efficient record keeping for future reference.

Figure 1A:
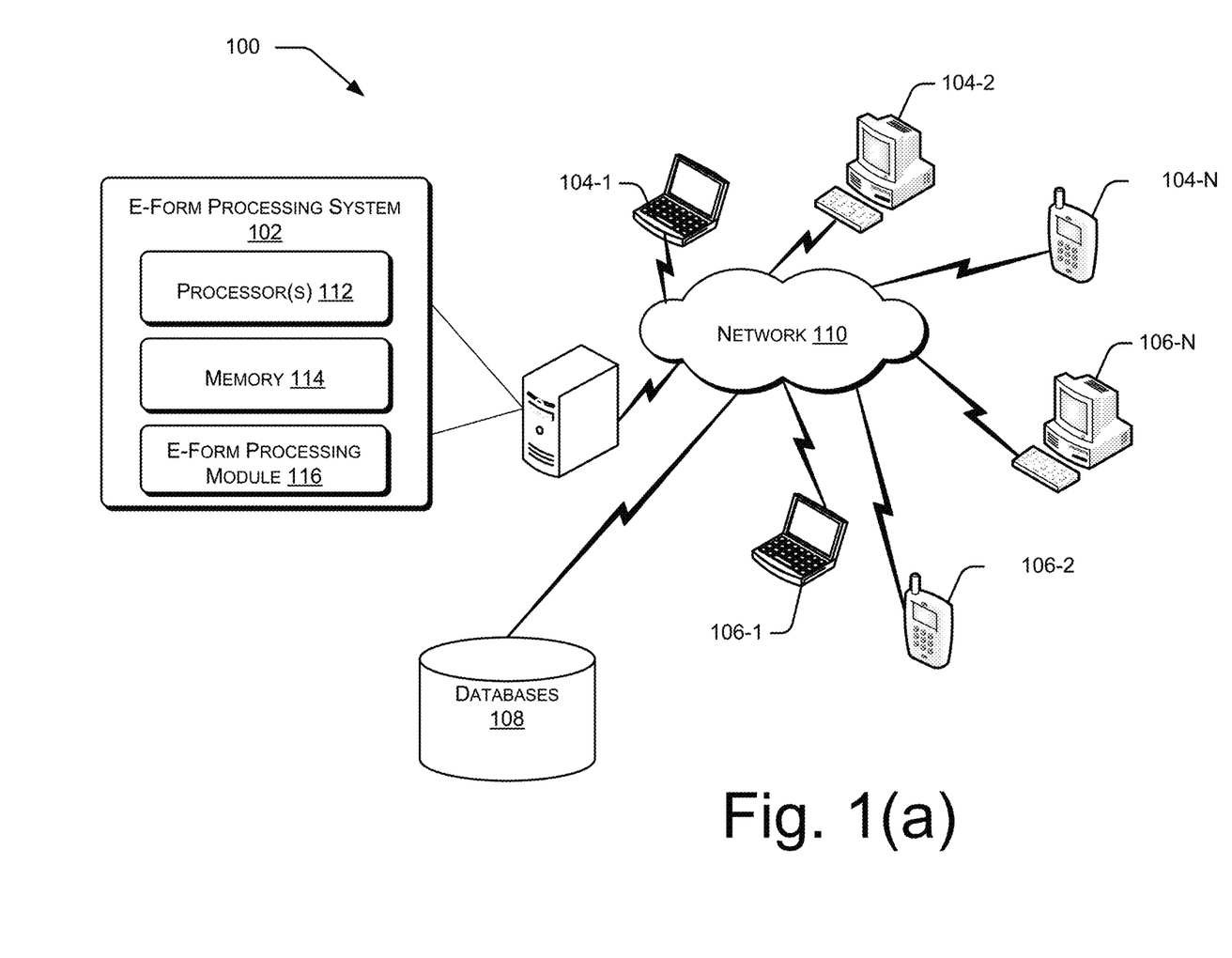
FIG. 1a illustrates an example network environment in which processing of electronic forms can be implemented, in accordance with an implementation of the present subject matter.

FIG. 1a illustrates an example network environment 100 in which processing of electronic forms can be implemented, in accordance with an implementation of the present subject matter.

The network environment 100 may include, for example, an organizations network infrastructure including databases and computing systems used by users in the organization. The organizations network infrastructure may also be accessible by customers from outside the organization through various computing devices. Accordingly, the network environment 100 may include an e-form processing system 102, user devices 104-1, 104-2, . . . 104-n, customer devices 106-1, 106-2, . . . 106-n, and databases 108. The user devices 104-1, 104-2 . . . 104-n may be collectively referred to as user device(s) 104. The customer devices 106-1, 106-2, . . . 106-n may be collectively referred to as customer device(s) 106. The e-form processing system 102, user devices 104, customer devices 106, and databases 108 can communicate with each other over a network 110.

The network 110 may be a wireless or a wired network, or a combination thereof. The network 110 can be implemented as any combination of the different types of networks, such as intranet, local area network (LAN), wide area network (WAN), the internet, and such. The network 110 may either be a dedicated network or a shared network, which represents an association of the different types of networks that use a variety of protocols, for example, Hypertext Transfer Protocol (HTTP), HTTP Secure (HTTPS), Transmission Control Protocol/Internet Protocol (TCP/IP), etc., to communicate with each other.

The e-form processing system 102, user devices 104, and customer devices 106 can be implemented in systems that include, but are not limited to, servers, desktop computers, hand-held devices, multiprocessor systems, personal digital assistants (PDAs), laptops, network computers, cloud servers, and the like. In one implementation, the e-form processing system 102, also referred to as system 102 hereinafter, includes one or more processor(s) 112, a memory 114 coupled to the processor 112, and an e-form processing module 116.

The processor 112 can be a single processing unit or a number of units, all of which could include multiple computing units. The processor 112 may be implemented as one or more microprocessors, microcomputers, microcontrollers, digital signal processors, central processing units, state machines, logic circuitries, and/or any devices that manipulate signals based on operational instructions. Among other capabilities, the processor 112 is configured to fetch and execute computer-readable instructions and data stored in the memory. The memory 114 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The e-form processing module 116 may be a hardware module, a software module or a combination of the two. In one implementation, the e-form processing module 116 may be hosted on the memory 114 and may be executable by the processor 112.

In operation, the e-form processing module 116 can receive a request for generation of an e-form from a user device 104. The request can include parameters that can be used for selection of a form template from pre-defined form templates. The parameters can include, for example, a form type, applicant type, nature of request, etc. In one example, when the e-form processing system is implemented in a financial institution for credit approval, the parameters can include a form type, such as credit request form for purchase of capital goods, an applicant type, such as individual or small enterprise or large enterprise, and nature of request, such as request for credit of USD One Million. Accordingly, the e-form processing module 116 can select an appropriate form template from pre-defined form templates and can generate an e-form based on the selected form template. In one implementation, the e-form can include a plurality of modular sections arranged in a pre-defined order, each modular section being associated with user role and privileges.

Further, on generation of the e-form, the e-form processing module 116 can retrieve data from at least one of the databases 108 to partly populate at least one of the modular sections in the e-form. Thus, data that is already available in different databases in the organization can be automatically collated and presented for processing. The e-form processing module 116 can then provide subsets of the modular sections to designated users based on the user privileges and a workflow associated with the e-form. Accordingly, a processed e-form can be created based on data inputs received from the designated users and the retrieved data. The processed e-form can also be associated with at least one external document. Details about processing of an e-form to create a processed e-form will be discussed in detail later with reference to FIG. 1b.

From the processed e-form, a processed electronic document including the modular sections populated with the retrieved data, the data inputs, and external data from the external document can be generated. In one implementation, the retrieved data, the data inputs, and the external data are arranged in a pre-defined order in the processed electronic document. The processed electronic document thus generated may be an XML document, a PDF document, an image document, and the like, and can be used for faster decision making as it includes the retrieved customer data, user data inputs, and external data in one place. It can also help in efficient record keeping and data retrieval for future reference.

Figure 1B:
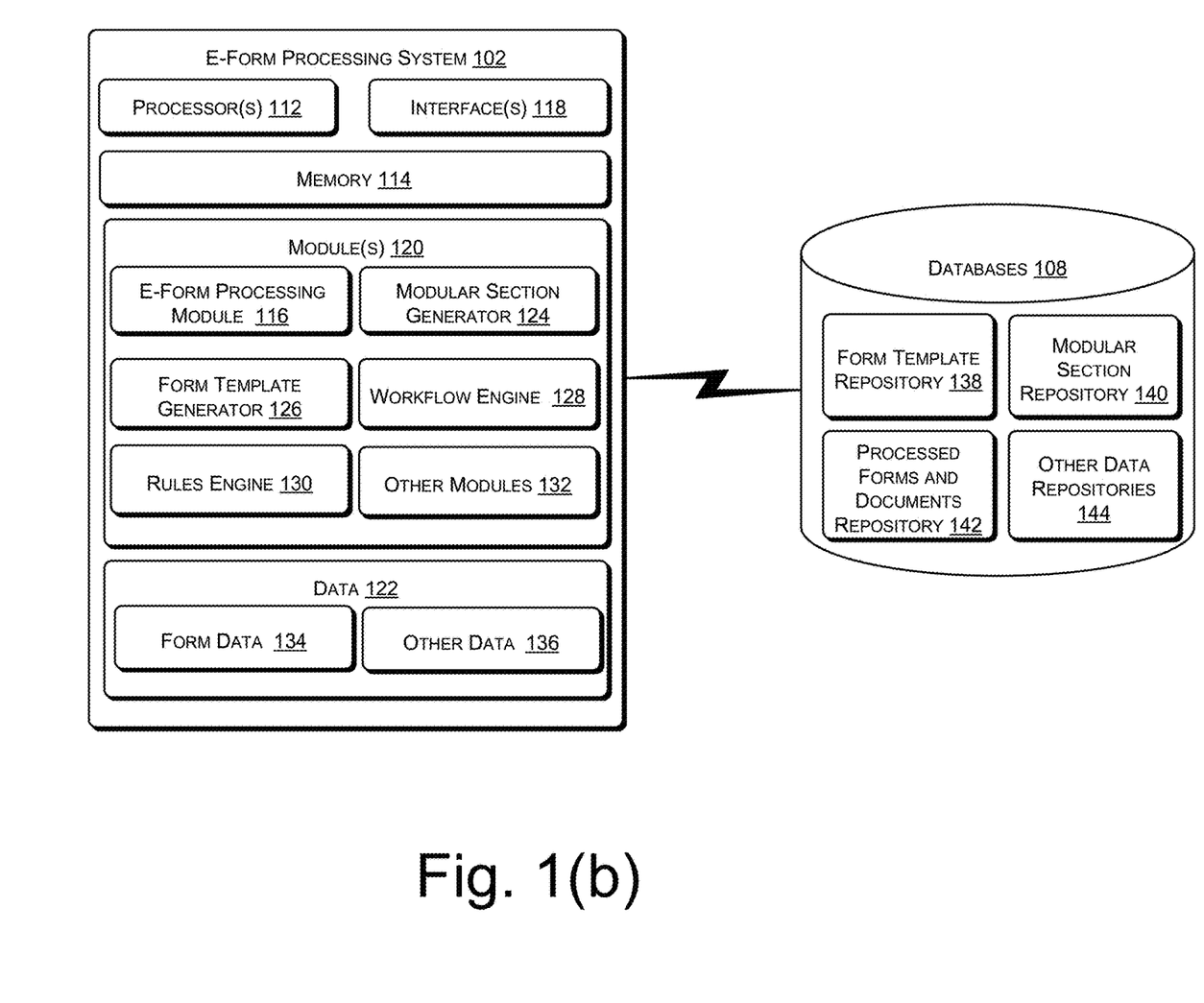
FIG. 1b illustrates an example system for processing of electronic forms, in accordance with an implementation of the present subject matter.

FIG. 1b illustrates an example e-form processing system 102, in accordance with an implementation of the present subject matter. As discussed above, the system 102 can include the one or more processor(s) 112 and the memory 114 coupled to the processor 112. In addition, the system 102 can include interfaces 118, modules 120, and data 122.

The interfaces 118 may include a variety of software and hardware interfaces, for example, interfaces for peripheral device(s), such as a keyboard, a mouse, an external memory, and a printer. Further, the interfaces 118 may enable the system 102 to communicate with other computing systems, such as the user devices 104, customer devices 108, databases 108, web servers, and external databases. The interfaces 118 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 118 may also include one or more ports for connecting a number of computing systems with one another or to another server computer. Further, the interfaces 118 can include a display screen to provide a graphical user interface (GUI) to users.

The modules 120 may be hardware nodules, software modules or a combination of the two. In one example, the modules 120 and the data 122 may be coupled to the processor 112. The modules 120, amongst other things, include routines, programs, objects, components, data structures, etc., which perform particular tasks or implement particular data types. The modules 120 may also be implemented as signal processor(s), state machine(s), logic circuitries, and/or any other device or component that manipulate signals based on operational instructions.

In an implementation, the modules 120 include the e-form processing module 116 discussed above, a modular section generator 124, a form template generator 126, a workflow engine 128, a rules engine 130, and other module(s) 132. The other modules 132 may include programs or coded instructions that supplement applications or functions performed by the system 102. Although shown on a single system 102, it will be appreciated that the modules 120 may be distributed between multiple systems that in combination act as the system 102.

Referring to the data 122, the data 122 may include form data 134 and other data 136. The other data 136 amongst other things, may serve as a repository for storing data that is processed, received, or generated, as a result of the execution of one or more modules in the modules 120. Although the data 122 is shown internal to the system 102, it may be understood that the data 122 can reside in an external repository (not shown in the figure), which may be coupled to the system 102.

Further, the system 102 can interface with databases 108, which can include a form template repository 138, a modular section repository 140, processed forms and documents repository 142, other data repositories 144, and the like. While the databases 108 are shown as one set of databases, it will be understood that they need not be co-located, but can be distributed. Further, the other data repositories 144 may include organizational databases, such as customer database, banking accounts database, collateral database, etc. While some of these organizational databases may not be linked to each other and may run on different platforms and technologies, by interfacing them with the system 102, the information available in the different organizational databases can be made centrally available for the e-form processing thereby increasing efficiency and reducing duplication and overheads.

In one implementation, the system 102 can be used to create various components, such as modular sections of forms, form templates, workflows, and business rules integrated with workflows. Further, based on these components, the system 102 can receive a form processing request and accordingly generate and process an e-form.

In operation, to create the modular sections, the modular section generator 124 can be used. A modular section can be understood as a logical group of data fields that form a section of a form. Thus each modular section can include data fields related to a particular logical group such that the different modular sections can be processed in parallel or sequentially. For example, in case of credit processing, general customer information may be one modular section that can include data fields relating to customer name, customer account number, date of birth or incorporation date, address for communication, telephone number, etc. Customer credit history may be another modular section with data fields related to previous loans taken by the customer if any. Customer financial information can be a third modular section with data fields related to income, expenses, taxes paid, and the like.

To create modular sections, the modular section generator 124 can access pre-defined data fields and data validation rules from the databases 108. In one example, a list of the pre-defined data fields and the data validation rules to be created can be provided by a business administrator of the organization implementing the system 102. Based on this, a programmer can create applications or apps that can correspond to these pre-defined data fields associated with corresponding data validation rules and these data filed apps can be stored in the databases 108. Thus, the programmer can initially create the apps as a one-time activity and these can be subsequently used by the users in the organization to define modular sections and form templates without additional involvement from the programmer. In one implementation, to help the user define the modular sections, the modular section generator 124 can provide the apps corresponding to the pre-defined data fields over a graphical user interface (GUI) as interactive elements. For example, the interactive elements can be icons that can be dragged and dropped by a user into a workspace on the GUI to create a modular section.

A workspace, as generally understood, is a portion of a GUI where user actions, such as clicking, typing, dragging and dropping icons, etc., can be recognized by a back end module, such as the modular section generator 124, and can be acted upon by the back end module. In this example, once data fields are added to or removed from a workspace, the modular section generator 124 creates a modular section by collating the data fields present in the workspace and corresponding data validation rules. The modular section thus created can be stored in the modular section repository 140 using an identifier, such as "credit history".

In one example, the interactive elements can be provided in a menu bar or menu window on one side of the GUI and the workspace can be provided on the other side. Accordingly, the user can be given an option to drag and drop one or more icons into the workspace and also to arrange the icons in a particular order to form each modular section. In another implementation, some of the modular sections may also be pre-defined by the programmer and provided on the GUI in the menu bar. The modular section generator 124 can allow the user to edit the pre-defined modular sections by adding or removing data fields from the modular sections using the interactive elements.

Each modular section thus generated can be understood to be an application or app in itself, which can receive data in the data fields and can validate the received data based on the data validation rules. Since the creation of these modular sections can be performed through an intuitive drag and drop interface, a skilled programmer may not be required for creating the modular sections from the pre-defined data fields.

One or more of the modular sections thus created can also be associated with appropriate organizational databases in the other data repositories 144 to enable automatic retrieval of data. For example, the modular section related to general customer information may be associated with a customer information database (not shown) such that when the customer account number is provided, the rest of the customer information may be retrieved and populated in the customer information modular section by the system 102.

Further, the form template generator 126 may be used to create form templates using the modular sections. In one example, a business administrator in the organization can decide on the number of form templates to be generated and the modular sections and data fields to be used for each of the form templates based on business requirements and business and regulatory policies. In one implementation, to generate a form template, the form template generator 126 can provide the modular sections available in the modular section repository 140 as interactive elements, such as icons, that can be dragged and dropped by a user into a workspace on a GUI to create the form template. The icons or interactive elements corresponding to the modular sections may also be provided through a menu bar or menu window on one side of the GUI and the workspace may be provided on the other. In case a modular section to be used in a particular form template is not available in the menu bar or window, the user can create that modular section and store it in the modular section repository 140 using the modular section generator 124 as discussed above before generating the form template. Thus, involvement of a skilled programmer may not be needed for generation of form templates.

The form template generator 126 can additionally allow the user to select data fields in a modular section while creating the form template. For example, while the modular section for general customer information may include a data field for passport number, in case this information is not required for a particular form template, the user can delete the data field from that form template. For this, in one example, when the user adds a modular section to the workspace, the modular section is displayed along with the data fields present therein. The user can then remove one or more data fields and may also add data fields from the data fields menu bar or menu window into that modular section. Further, the user can also arrange the modular sections in a pre-defined order to create the form template to aid in processing.

Once the modular sections are selected and arranged in the workspace, the form template generator 126 creates the form template by collating the modular sections and respective data fields. The form template thus created can be stored in the form template repository 138. Further, each form template can be associated with parameters related to business process for which the form template is to be used. For example, one form template may be for use for credit processing for retail customers for a credit of less than one million dollars, while another may be used for credit processing for retail customers for a credit of more than one million dollars but less than five million dollars, and so on. Accordingly, based on customer requirements that specify the parameters, a form template can be automatically selected from the form template repository 138. Further, in case a new form template is to be generated, it can be generated using the form template generator 126 and the modular sections and the data fields in respective repositories. Thus, new form templates can be generated by users without high level programming skills. Also, the time required for generation and roll-out of new form templates corresponding to new business processes is substantially reduced.

Further, once a form template is generated, it can be associated with a workflow using the workflow engine 128. The workflow engine 128 can create the workflow for being associated with each form template, and thereby with each e-form, based on user inputs. For example, using the workflow engine, an administrator can define various activities to be performed for processing an e-form created from a particular form template and the sequence in which the activities are to be performed. The activities can be defined based on regulatory requirements and organizations business policies. The administrator can further designate users or roles of users, such as analyst, manager, auditor, etc., who may perform the activities and can define subsets of the modular sections in the form template (and e-form) that would be accessible to each designated user. Thus, while the e-form is being processed, a subset of the modular section may be made available to some users and not to others in order to keep associated data confidential. For example, credit history information may not be made available to a user who is authorized to only check general customer information.

In one implementation, the work flow can include certain activities that may be done by the system 102, referred to as system activities, and other activities to be performed by a user, referred to as user activities. For example, the first step in the workflow may be input of parameters for creation of an e-form, which may be defined as a user activity. The second step may be creation of the e-form that can be a system activity performed by the e-form processing module 116 by selecting a form template based on the parameters and creating an e-form from the form template. The third step may be to retrieve and populate available data automatically from the databases 108 in those modular sections. This may also be a system activity performed by the e-form processing module 116. The fourth step may be validation of data in a subset of the modular sections of the e-form by a first designated user and providing user inputs, which may be a user activity. Further, the workflow can be designed to provide the e-form including the retrieved data after the third step to the first designated user in the fourth step, and so on.

In one example, the workflow may be created such that some of the steps in the workflow may be done in parallel while others may be done in sequence. Further, based on user privileges and roles, the workflow can define the type of processing that a user may perform. For example, certain users may be able to edit data in the e-forms, while others may be able to read and comment without changing any data, etc.

In one implementation, business rules may be integrated into the workflow for enforcing business and regulatory policies, apart from validation of data. For this, the rules engine 130 can be used to integrate business rules and events into the workflow generated by the workflow engine 128. The rules engine 130 can allow a user to upload rules in a given syntax, for example, as an MS-Excel file, and can integrate the rules with the workflow. In one implementation, the business rules may also specify access restrictions for users and the workflow engine may automatically designate users and associate a subset of the modular sections for each user activity based on the business rules. Accordingly, in case any changes are required in the workflow, the business rules can be easily modified and re-integrated into the workflow without having to regenerate the workflow.

In operation, when a customer approaches an organization for processing of a request, a user, such as a customer relationship manager, can initiate the form processing using the system 102. In one example, the user can initiate the e-form processing module 116 by providing the customer's form processing request including parameters for form selection. The e-form processing module 116 can select a form template from the pre-defined form templates and can generate an e-form based on the form template. Further, the e-form processing module 116 can retrieve data from at least one database to partly populate at least one of the modular sections in the e-form. Subsets of the modular sections in the e-form can be then provided to designated users based on the user privileges and a workflow associated with the e-form. The users, while providing the data inputs and processing the e-forms, may also associate the e-form with one or more external documents to substantiate a comment or action taken. The e-form processing module 116 can then create a processed e-form including the retrieved data and the data inputs, and having at least one external document associated with the processed e-form. Based on this processed e-form a processed electronic document including the modular sections populated with the retrieved data, the data inputs, and external data from the external document can be generated, with the different data being arranged in the pre-defined order. The electronic document thus generated can be archived for easy search and retrieval subsequently. Further, the electronic document as a whole can also be sent to one or more users, such as a committee or any other group, for taking a final decision on the customers request.

Figure 2:
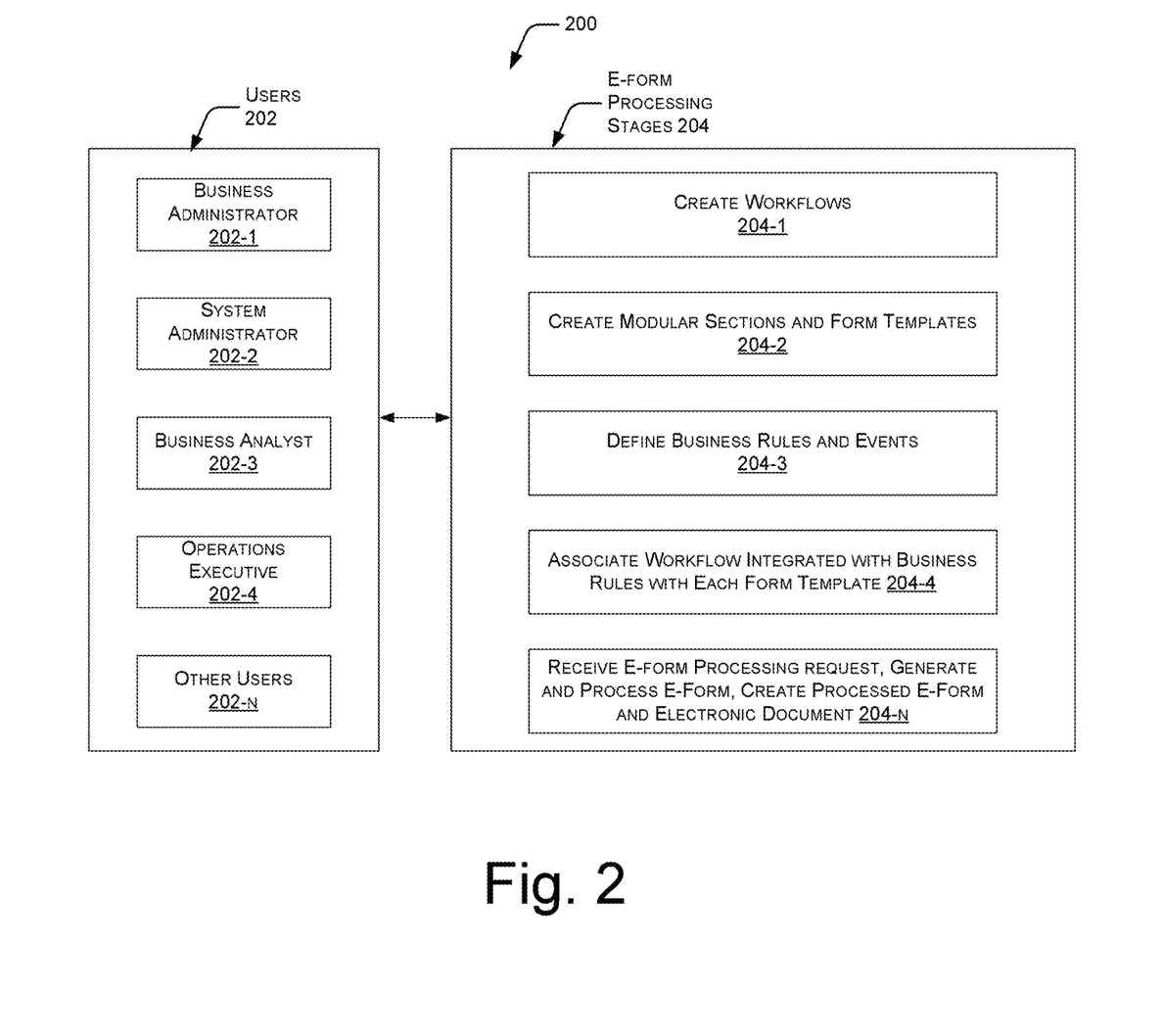
FIG. 2 illustrates an example scenario for processing of electronic forms, in accordance with an implementation of the present subject matter.

An implementation of the e-form processing systems and methods is further explained below with the help of an example implementation scenario. FIG. 2 illustrates an example scenario 200 for processing of electronic forms, in accordance with an implementation of the present subject matter.

The example scenario 200 illustrate various users 202 who may interact with the system 102 during various e-form processing stages 204. For discussion purposes, the example scenario 200 is explained with reference to a credit approval process performed in a financial institution. However, it will be appreciated that other example scenarios related to other business domains and organizations may also be similarly implemented albeit with a few variations as will be understood to a person skilled in the art.

To understand the working and advantages of the example scenario 200, first a brief description is provided about conventional or traditional credit approval processes. Conventionally, financial institutions offer different types of credit to clients. The term credit has been used to indicate loans, financial borrowings, etc. Financial institutions may include both banking institutions and non-banking financial institutions. Different types of credit include home loan, education loan, automobile loan, personal loan, term loan, overdraft, letter of credit. etc.

Financial institutions offer credit to clients, such as retail customers, for a particular purpose, such as offering a home loan for purchasing a house, offering an education loan for a client to pursue education interests, etc. For each type of credit, the financial institution usually defines multiple credit schemes. For example, for home loan type of credit, the financial institution may offer a home loan credit scheme with terms such as, a home loan of USD one million for a period of 15 years at an interest rate of 5%, and the financial institution may also offer another home loan credit scheme with terms such as a home loan of USD five million for a period of 20 years at an interest rate of 3%. The terms of credit schemes for each type of credit may be in accordance to regulatory rules and credit policies of the financial institution.

Similarly, financial institutions may offer credit to clients, such as corporate customers, for different needs, such as working capital loan to buy raw material, general purpose term loan for expansion and modernization of manufacturing lines. The terms of credit for different types of working capital loan or term loans may be different. The terms of credit for each type of credit may be in accordance to regulatory rules, credit policies of the financial institution, or specifically customized for the corporate customer.

Clients interested in a credit scheme may apply for a credit scheme by initiating an application with the financial institution. The application may include information sought by the financial institution for checking compliance to terms of the credit scheme. The information may include clients details, purpose of applying for the credit scheme, details of the area into which the credit may be invested, etc. Based on a scrutiny of the information provided by the client, the financial institution may approve or reject the application for the credit scheme.

In conventional systems, for automating the credit approval process, financial institutions approach information technology (IT) vendors for designing one or more workflow systems in accordance to their credit schemes. The IT vendors may be associated with the financial institution or may alternatively be outsourced service providers. The IT vendors design systems in compliance with the specification of the financial institution. The workflow system includes a sequence of process activities to be followed for processing credit applications. Personnel of the financial institution who work on the credit scheme may use the system and follow the procedure prescribed by it. However, the procedure involved in designing a system suitable for the credit scheme is cumbersome, and hence there may be a delay in making the scheme available. Further, in case of an amendment of terms of a credit scheme or a policy, the financial institution may again approach the IT vendor requesting a change in the system. There may be further delays, and correspondingly the costs for the financial institution may also escalate. Further, since the window of time available for providing beneficial schemes to clients is usually limited, the financial institution may not be able to make best use of this window.

In view of the above, in one example, a financial institution can use the system 102 in the example scenario 200 to efficiently, quickly, and cost effectively rollout credit schemes by creating new electronic forms and workflows as per business requirement and managing processing of the e-forms as per the workflows.

As shown in FIG. 2, the users 202 can include a business administrator 202-1, a system administrator 202-2, a business analyst 202-3, an operations executive 202-4, and other users 202-n. One or more of the users 202 may interact with the system 102 at different points in time to create and process e-forms in the different e-form processing stages 204.

At stage 204-1, a user, such as a business analyst 202-3, can model the cross functional (departmental) credit workflow as per the financial institutions credit process. At this stage, the workflow is modeled to define the various activities and users that will have to be performed to process each e-form. The modeling of the workflow can be performed using for example, MS-Visio or other workflow model creation tools. The actual configuration of the modeled workflow and association with respective e-form will be performed later in stage 204-4. Thus, in contrast to traditional approach where workflow is hardwired in the systems, the system 102 allows different workflow versions to be modeled for different business lines.

At stage 204-2, various modular sections and form templates may be created, by for example, a business administrator 202-1 or a system administrator 202-2. As discussed, the modular section generator 124 and the form template generator 126 can provide interactive elements (corresponding to apps) over a GUI to define/change modular sections and form templates through easy-to-use, drag-and-drop based editor. Thus, the user can define which modular sections corresponding to what information appears on a form template (and eventually on the processed e-form and processed document) and in what order. Dynamic form template creation also gives capability to define different templates for different lines of business easily as compared to conventional techniques that require system downtime and high levels of programming skills. Further, as different modular sections can be associated with different organizational databases, the entire information set available within the financial institution can be effectively collated at one place. This in turn allows users, such as credit officers, to use just one application and do complete end-to-end credit processing.

At stage 204-3, business rules can be defined and associated with events, for example, by a business analyst 202-3 using the rules engine 130. The defined business rules and event can be maintained at a central repository. Thus, existing rules can be amended or new ones can be authored in real-time easily. Further, as will be explained below, these rules can be integrated with workflows. The rules and events can also be used for business and regulatory policy enforcement.

At stage 204-4, the workflow identified/modeled in stage 204-1 can be configured in system 102 and associated with form templates, so that the workflow get associated with e-forms when they are created from form templates. The workflow can be defined by, for example, a system administrator 202-2 or a business administrator 202-1 or a business analyst 202-3, using the workflow engine 128 that provides a graphical workflow editor. The workflow can thus be defined and/or changed through easy-to-use, drag-and-drop based graphical editor without requiring system downtime. Different workflow versions can also be maintained at the same time for different business lines. Further, once the workflows and business rules are defined for different business lines, they can be integrated by associating them together. For example, business rules and events can be integrated into a workflow as check points or decision points.

It will be appreciated that stages 204-1, 204-2, and 204-3 can be performed in any order and is not restricted to the order mentioned above.

Once the system 102 is configured through stages 204-1 to 204-4, for credit sanctioning and approval, the system 102 can be used for credit sanctioning and appraisal in the financial institution. For this, at stage 204-n, various users, such as customer relationship manager, credit sanctioner, etc., may receive an e-form processing request from a customer, generate and process an e-form using the system 102, to create a processed e-form and a processed electronic document. Throughout the sanctioning and assessment process, the system 102 also allows access to a centralized document repository to store work in progress, proposals, and supporting documents. Also, the users can search for and view attached or external documents. Further, the external document can be associated with the processed e-form and can be merged or annexed to the main credit proposal. The processed e-form and electronic document thus created can be archived for future reference as per regulatory and business policy.

Figure 3:
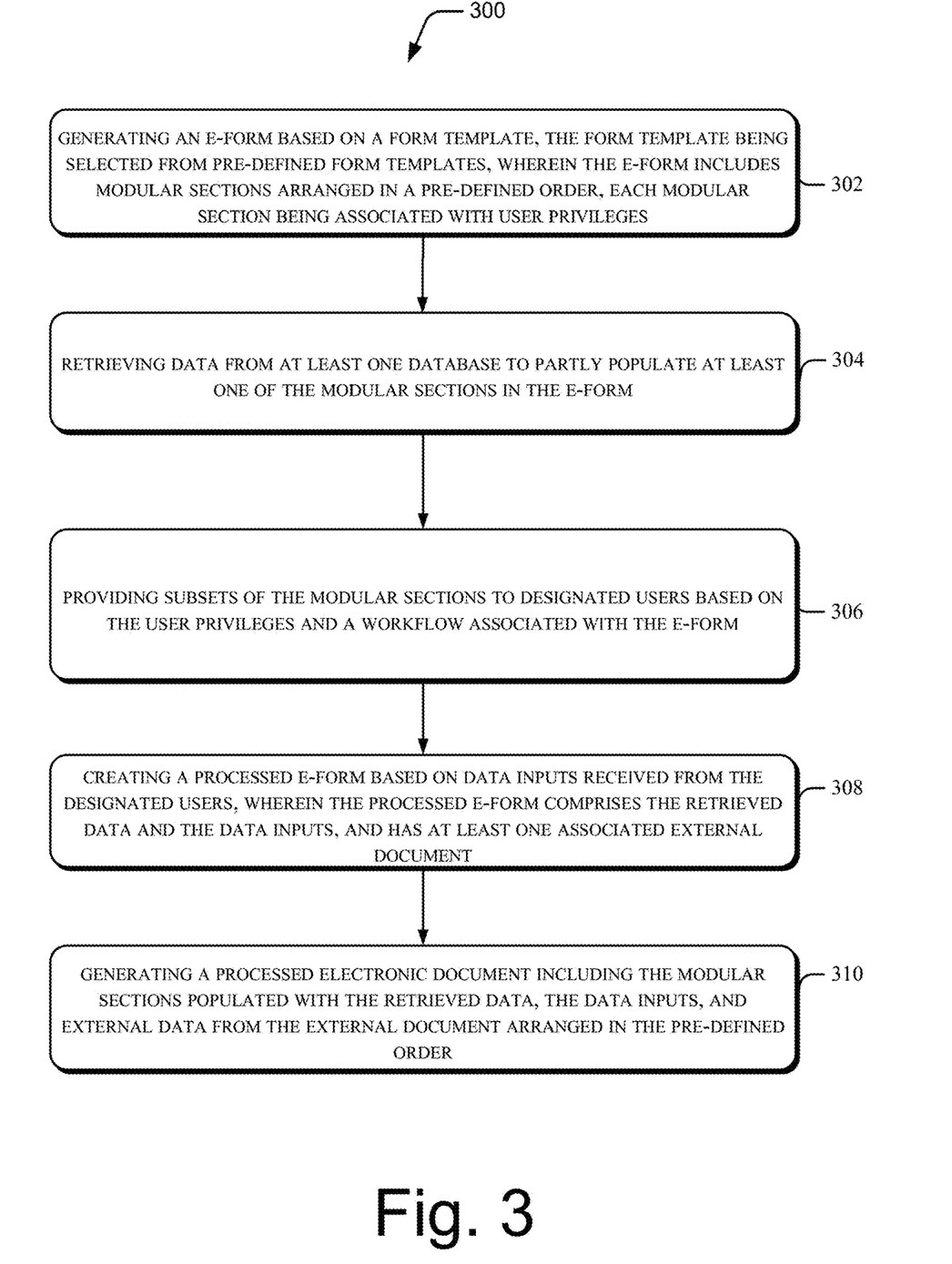
FIG. 3 illustrates an example method for processing of electronic forms, in accordance with an implementation of the present subject matter.

FIG. 3 illustrates an example method 300 for processing of electronic forms, in accordance with an implementation of the present subject matter. In an example, the method 300 may be implemented by a module of a computing system, such as the modules 120 of the e-form processing system 102.

The order in which the method is described is not intended to be construed as a limitation, and any number of the described method blocks can be combined in any order to implement the method, or any alternative methods. Additionally, individual blocks may be deleted from the method without departing from the subject matter described herein. Furthermore, the methods can be implemented in any suitable hardware platform(s).

The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

In another implementation, the method may be stored and executed as one or more instructions or code on a non-transitory computer-readable medium. Examples include computer-readable media encoded with a data structure and computer-readable media encoded with a computer program. Computer-readable media may take the form of an article of manufacturer. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also be included in the scope of computer-readable media Referring to FIG. 3, at block 302, an e-form may be generated based on a form template, the e-form including modular sections arranged in a pre-defined order, each modular section being associated with user privileges. The form template may be selected from pre-defined form templates, for example, based on a form processing request that includes parameters for selection of the form template from the pre-defined form templates. The selection of the form template and generation of the e-form may be done, for example, by the e-form processing module 116. In one implementation, the various modular sections and the form templates may be generated by the modular section generator 124 and the form template generator 126 and may be stored in the modular section repository 140 and the form template repository 138 respectively, as discussed above At block 304, data may be retrieved from at least one database to partly populate at least one of the modular sections in the e-form. For example, the e-form processing module 116 may retrieve the data from one or more of the databases 108.

At block 306, subsets of the modular sections may be provided to designated users based on the user privileges and a workflow associated with the e-form. For example, the e-form processing module 116 may provide the subsets of the modular sections to designated users for processing. The workflow may be created, for example, using the workflow engine 128 and may have rules integrated into the workflow using the rules engine 130 as discussed above. In one example, each of the subsets of the modular sections may be provided to the designated users in one of an editable mode, a read-only mode, and a comment mode, based on the user privileges.

At block 308, a processed e-form may be created based on data inputs received from the designated users, wherein the processed e-form comprises the retrieved data and the data inputs, and has at least one external document associated with the processed e-form. For example, the e-form processing module 116 may create the processed e-form.

At block 310, a processed electronic document including the modular sections populated with the retrieved data, the data inputs, and external data from the external document may be generated. The retrieved data, the data inputs, and the external data may be arranged in the pre-defined order. For example, the e-form processing module 116 may generate the processed electronic document from the processed e-form.

Although implementations for methods and systems for processing of electronic forms are described, it is to be understood that the present subject matter is not necessarily limited to the specific features or methods described. Rather, the specific features and methods are disclosed as implementations for processing of electronic forms.

What is claimed is:

1. A system for processing electronic forms (e-forms) in an organization, the system comprising:
   a processor;
   an e-form processing module executable by the processor to:
      generate an e-form based on a form template, the form template being selected from pre-defined form templates, wherein the e-form includes modular sections arranged in a pre-defined order, each modular section being associated with user privileges, and wherein each pre-defined form template is created by:
         providing interactive elements corresponding to available modular sections present in a modular section repository;
         receiving user inputs on the interactive elements to generate the form template, wherein the user inputs correspond to selecting the modular sections from the available modular sections;
      retrieving data from at least one database to partly populate at least one of the modular sections in the e-form;
      interfacing with the at least one database to access information available in one or more organizational databases, and retrieving data from the one or more organizational databases, the one or more organizational databases being run on one or more platforms and wherein the information is enabled to be centrally available to reduce at least one of duplicates and overheads;
      providing at least one subset of the modular sections to designated users based on the user privileges and a workflow associated with the e-form after populating with the retrieved data, wherein the user privileges are associated with at least one of data security and confidentiality;
      specifying access restrictions for the designated users automatically and associating the at least one subset of the modular sections for a user activity based on one or more business rules;

creating a processed e-form in a parallel manner based on data inputs received from the designated users, wherein the processed e-form comprises the retrieved data and the data inputs, and has at least one external document associated with the processed e-form, wherein the processed e-form is provided to a second designated user after verification of the retrieved data from a first designated user in a sequential manner;

defining the modular sections and the form template by providing one or more applications corresponding to one or more pre-defined data fields over a drag and drop graphical user interface;

generating a processed electronic document including the modular sections populated with the retrieved data, the data inputs, and external data from the external document, wherein the retrieved data, the data inputs, and the external data are arranged in the pre-defined order; and collating automatically the external data and the retrieved data from the at least one database;

a workflow engine, executable by the processor, to create the workflow for each processed e-form based on user inputs, the workflow comprising system activities and user activities; and a rules engine, executable by the processor, to integrate rules in the workflow, the rules comprising validation rules, flow rules, and the user privileges.

2. The system of claim 1, further comprising a modular section generator executable by the processor to:

create the modular sections for the e-forms, wherein each of the modular sections includes data fields for data entry;

associate the at least one of the modular sections with the at least one database; and store the modular sections in a modular section repository.

3. The system of claim 1, wherein the pre-defined form templates are created by a form template generator executable by the processor.

4. The system of claim 3, where the form template generator is executable to provide the interactive elements over the drag and drop graphical user interface.

5. The system of claim 1, wherein the e-form processing module is further executable by the processor to receive a form processing request comprising parameters for selection of the form template from the pre-defined form templates.

6. The system of claim 1, wherein the e-form processing module is further executable by the processor to provide each of the subsets of the modular sections to the designated users in one of an editable mode, a read-only mode, and a comment mode, based on the user privileges.

7. A method for processing electronic forms (e-forms) in an organization, by a e-form processing system including a processor, the method comprising:

generating an e-form based on a form template, the form template being selected from pre-defined form templates, wherein the e-form includes modular sections arranged in a pre-defined order, each modular section being associated with user privileges, and wherein each pre-defined form template is created by:

providing interactive elements corresponding to available modular sections present in a modular section repository; and receiving user inputs on the interactive elements to generate the form template, wherein the user inputs correspond to selecting the modular sections from the available modular sections;

creating a workflow for each e-form based on user inputs, the workflow comprising system activities and user activities;

integrating rules in the workflow, the rules comprising validation rules, flow rules, and the user privileges;

retrieving data from at least one database to partly populate at least one of the modular sections in the e-form;

interfacing with the at least one database to access information available in one or more organizational databases, and retrieving data from the one or more organizational databases, the one or more organizational databases being run on one or more platforms and wherein the information is enabled to be centrally available to reduce at least one of duplicates and overheads;

providing at least one subset of the modular sections to designated users based on the user privileges and the workflow associated with the e-form after populating with the retrieved data, wherein the user privileges are associated with at least one of data security and confidentiality;

specifying access restrictions for the designated users automatically and associating the at least one subset of the modular sections for a user activity based on one or more business rules;

creating a processed e-form in a parallel manner based on data inputs received from the designated users, wherein the processed e-form comprises the retrieved data and the data inputs, and has at least one external document associated with the processed e-form, wherein the processed e-form is provided to a second designated user after verification of the retrieved data from a first designated user in a sequential manner;

defining the modular sections and the form template by providing one or more applications corresponding to the one or more pre-defined data fields over a drag and drop graphical user interface;

generating a processed electronic document including the modular sections populated with the retrieved data, the data inputs, and external data from the external document, wherein the retrieved data, the data inputs, and the external data are arranged in the pre-defined order; and collating automatically the external data and the retrieved data from the at least one database.

8. The method of claim 7, further comprising:

creating the modular sections for the e-forms, wherein each of the modular sections includes data fields for data entry;

associating the at least one of the modular sections with the at least one database; and storing the modular sections in a modular section repository.

9. The method of claim 7, wherein the pre-defined form templates are created by a form template generator executable by the processor.

10. The method of claim 9, wherein the interactive elements are provided over the drag and drop graphical user interface.

11. The method of claim 7, further comprising designating a user and a subset of the modular sections with each user activity in the workflow based on the user inputs and the rules.

12. The method of claim 7, further comprising receiving a form processing request comprising parameters for selection of the form template from the pre-defined form templates.

13. The method of claim 7, further comprising providing each of the subsets of the modular sections to the designated users in one of an editable mode, a read-only mode, and a comment mode, based on the user privileges.

14. A non-transitory computer readable medium comprising instructions for processing electronic forms (e-forms) in an organization, the instructions comprising instructions to:
  generate an e-form based on a form template, the form template being selected from pre-defined form templates, wherein the e-form includes modular sections arranged in a pre-defined order, each modular section being associated with user privileges, and wherein each pre-defined form template is created by:
    providing interactive elements corresponding to available modular sections present in a modular section repository;
    receiving user inputs on the interactive elements to generate the form template, wherein the user inputs correspond to selecting the modular sections from the available modular sections, selecting data fields in the modular sections, and arranging the modular sections in the pre-defined order;
  creating a workflow for each e-form based on user inputs, the workflow comprising system activities and user activities;
  integrating rules in the workflow, the rules comprising validation rules, flow rules, and the user privileges;
  retrieving data from at least one database to partly populate at least one of the modular sections in the e-form after populating with the retrieved data;
  interfacing with the at least one database to access information available in one or more organizational databases, and retrieving data from the one or more organizational databases, the one or more organizational databases being run on one or more platforms and wherein the information is enabled to be centrally available to reduce at least one of duplicates and overheads;
  providing at least one subset of the modular sections to designated users based on the user privileges and the workflow associated with the e-form after populating with the retrieved data, wherein the user privileges are associated with at least one of data security and confidentiality;
  specifying access restrictions for the designated users automatically and associate the at least one subset of the modular sections for a user activity based on one or more business rules;
  creating a processed e-form in a parallel manner based on data inputs received from the designated users, wherein the processed e-form comprises the retrieved data and the data inputs, and has at least one external document associated with the processed e-form, wherein the processed e-form is provided to a second designated user after verification of the retrieved data from a first designated user in a sequential manner;
  defining the modular sections and the form template by providing one or more applications corresponding to one or more pre-defined data fields over a drag and drop graphical user interface;
  generating a processed electronic document including the modular sections populated with the retrieved data, the data inputs, and external data from the external document, wherein the retrieved data, the data inputs, and the external data are arranged in the pre-defined order; and
  collating automatically the external data and the retrieved data from the at least one database.

15. The non-transitory computer readable medium of claim 14, wherein the instructions for processing e-forms further comprise instructions to:
  create the modular sections for the e-forms, wherein each of the modular sections includes data fields for data entry;
  associate the at least one of the modular sections with the at least one database; and
  store the modular sections in a modular section repository.

16. The non-transitory computer readable medium of claim 14, wherein the pre-defined form templates are created by a form template generator executable by the processor.

17. The non-transitory computer readable medium of claim 14, wherein the instructions for processing e-forms further comprise instructions to:
  designate a user and a subset of the modular sections with each user activity in the workflow based on the user inputs and the rules.

* * * * *